Jan. 17, 1928.  1,656,253

H. A. WEAVER ET AL

DEVICE FOR LOCKING SPARE TIRES

Filed July 28, 1926  3 Sheets-Sheet 2

Inventors
H. A. Weaver
and F. A. Smith
By Bacon & Thomas
Attorneys

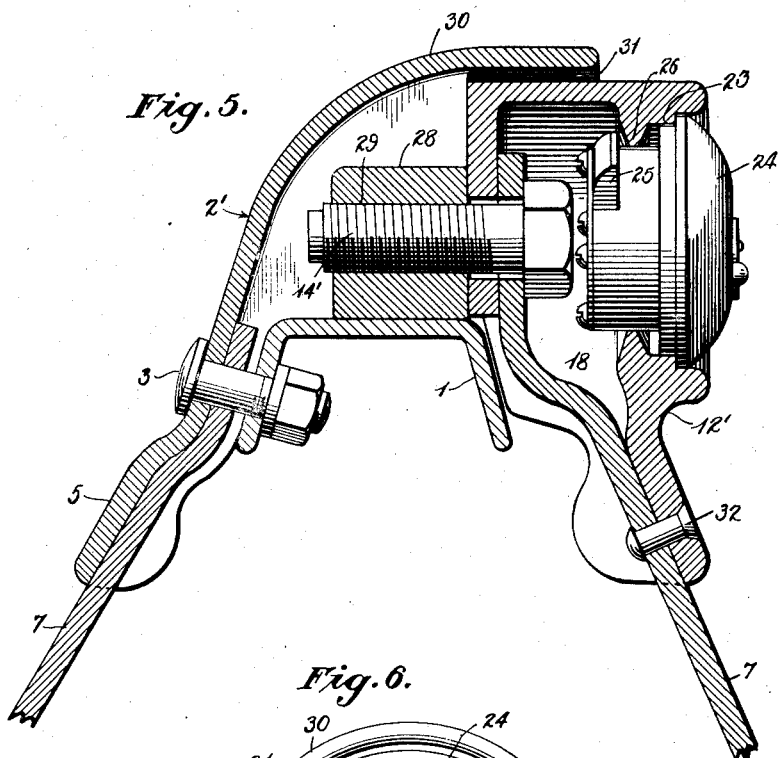
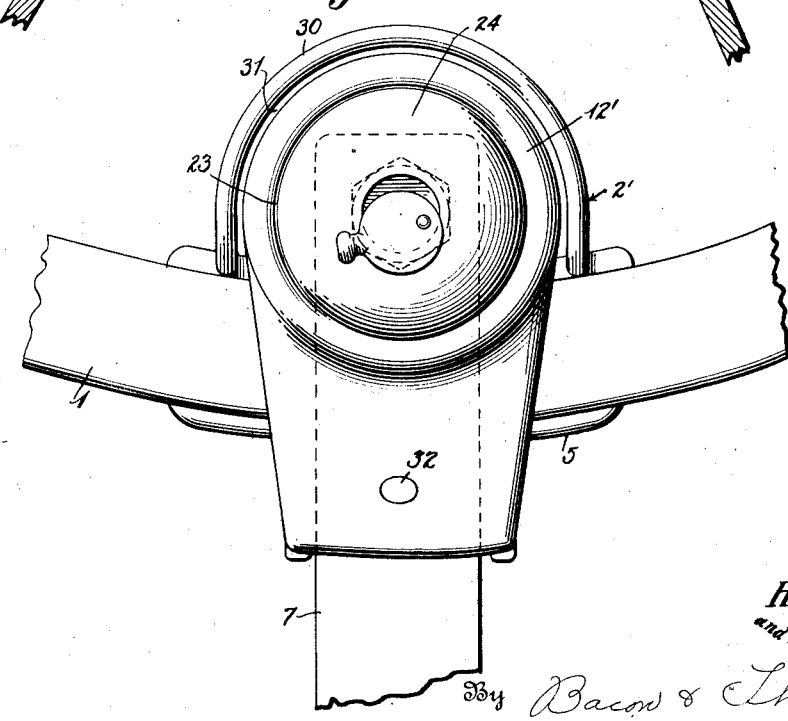

Patented Jan. 17, 1928.

1,656,253

UNITED STATES PATENT OFFICE.

HARRY A. WEAVER AND FREDRICK ARTHUR SMITH, OF INDIANAPOLIS, INDIANA, ASSIGNORS TO MARTIN PARRY CORPORATION, OF YORK, PENNSYLVANIA, A CORPORATION OF DELAWARE.

DEVICE FOR LOCKING SPARE TIRES.

Application filed July 28, 1926. Serial No. 125,536.

The invention relates to improvements in locking means for locking a spare tire and its rim to the spare tire carrier of a motor vehicle.

It is an object of the invention to provide an improved form of locking means which may be built in as a part of the spare tire carrier, or may be applied as an attachment to many of the conventional carriers now in use.

It is an object of the invention to provide a locking device of this type which will prevent the unauthorized removal of a tire and rim from the tire carrier.

The invention more specifically embodies a locking device of this character in which the rim is locked to the carrier by suitable cooperating locking clamps of a novel and desirable construction and further locked to the carrier by a locking strap or chain encircling the carrier and connecting with said locking clamps.

In the accompanying drawings,

Figures 5 and 6 show a modified form of the invention.

Figure 1:
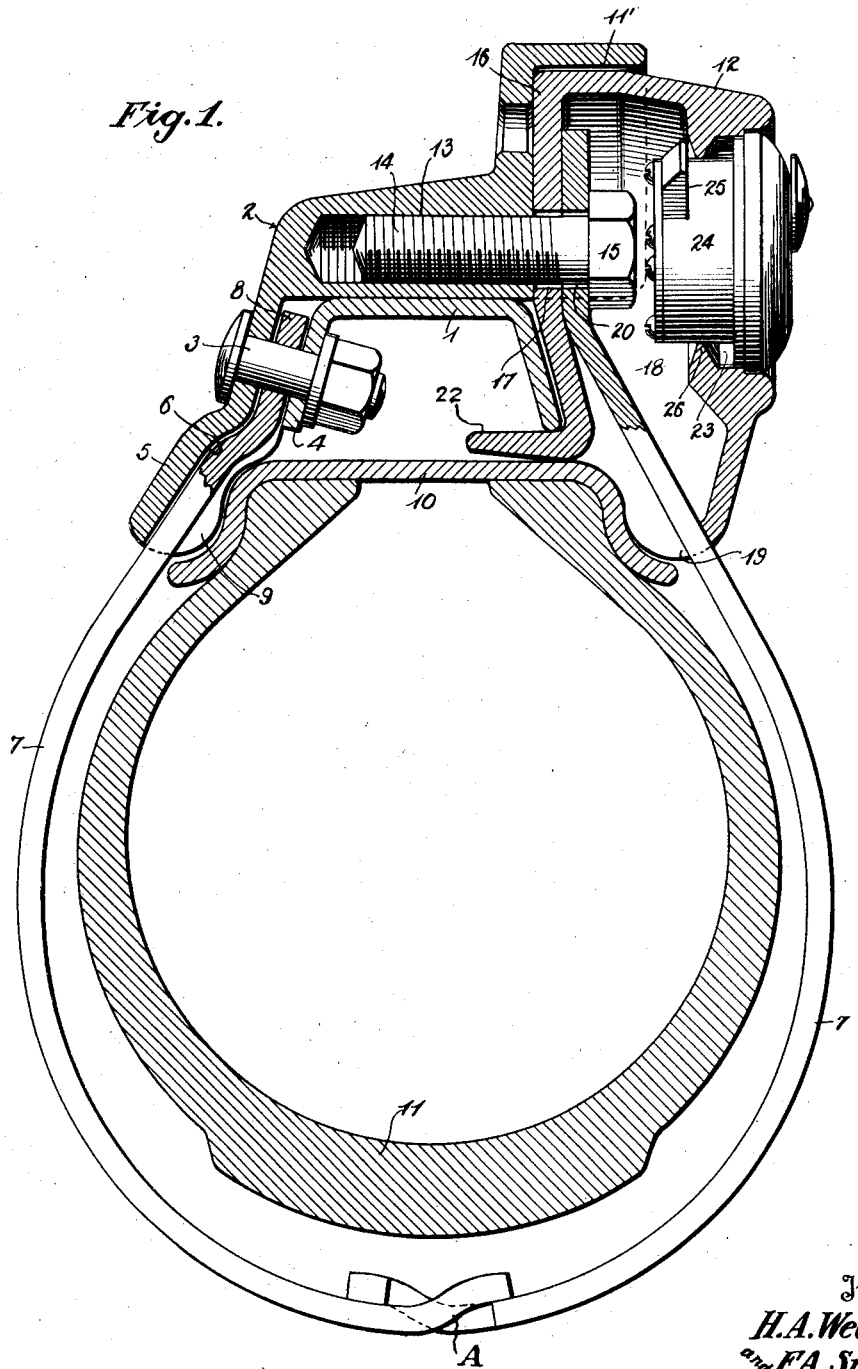
Figure 1 illustrates a sectional view through the tire carrier with the locking device thereon.

Referring now more particularly to the drawings wherein like reference characters indicate corresponding parts, numeral 1 designates a tire carrier of the ring type. This carrier is supported on an automobile in any approved manner.

As shown in Figure 1, the carrier has secured thereto a rim clamp 2. This clamp is bolted by the bolt 3 to the flange 4 of the ring carrier. The rim clamp 2 carries a depending flange portion 5, which flange portion intermediate its ends is formed with a recess 6 receiving the end 8 of a metallic strap 7. This strap has an aperture therein through which the bolt 3 passes whereby the strap is locked to the carrier. The walls 9 of the recess 6 are curved and extend outwardly so as to engage the spare rim 10 carrying the spare tire 11 as shown clearly in Figure 1 when this rim is placed on the carrier.

At its opposite end the rim clamp is formed with an open ended pocket 11' that is adapted to receive the clamp lock housing 12 which is of a structure that will be described hereinafter in detail. There is also provided in the rim clamp a lateral bore 13 which is formed with threads receiving an adjusting and locking screw 14 having a head 15. It is by means of this screw that the parts of the assembly are locked together and the spare tire locked to the carrier in a manner which will later appear.

Figure 2:
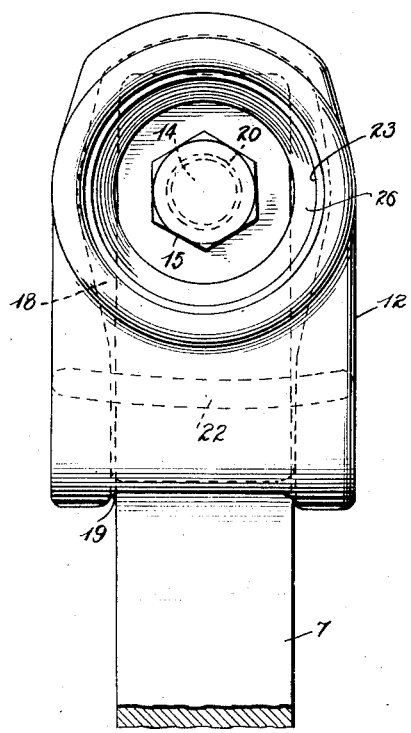
Figures 2 and 3 are detailed views of the upper parts of the locking assembly.

The locking assembly is, as before stated, provided with a removable clamp lock housing 12. This housing is shown in detail in Figure 2. As there shown, the housing is provided with a rear wall 16 having an opening 17 therein through which the locking bolt 14 passes. The lock housing also has formed therein a cavity 18 of substantial diameter entered at its lower end by an opening 19 extending through the casting from which this housing is made. It is through this opening that the free end of the strap 7 extends. This strap is formed with an opening 20 that is aligned with the opening 17 in the lock housing so that the lock housing and the end of the strap are clamped or tightly united to the rim clamp upon the adjustment of the fastening screw or bolt 14. The rear wall 16 of the housing is formed with an inturned flange 22 at its lower side which is forced between the edge of the ring carrier 1 and the demountable rim 10. This flange tapers in cross section so as to tightly wedge the spare tire on the carrier.

The outer face of the lock housing 12 is formed with an opening 23 extending therethrough. This opening is in axial alignment with the lateral bore 13 of the rim clamp. This opening receives a locking cap 24 embodying locking mechanism of the well known pin and tumbler type and shiftable locking bolts 25 projecting radially therefrom serving when the closure is in the opening to lie against the inner surface of the angular rim 26 of the lock housing to retain this locking cap 24 in a locked position where it closes the opening and prevents access from being had to the head of the bolt 14, which projects from the wall of the opening in the front plate of the housing and it is against the rear face of this rim that the lock bolts 25 engage. To remove the cap and to permit access to be had to the bolt 14 a key is inserted in the key opening in the lock contained in the cap and turned to retract the bolts 25. When these bolts are retracted the cap can be moved bodily from the opening so that the desired tool can be inserted in the opening for removing the bolt 14.

Figure 3:
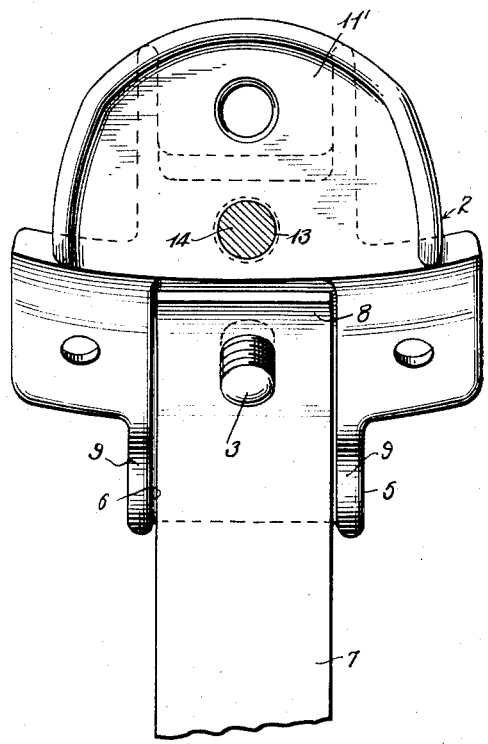
Figure 4:
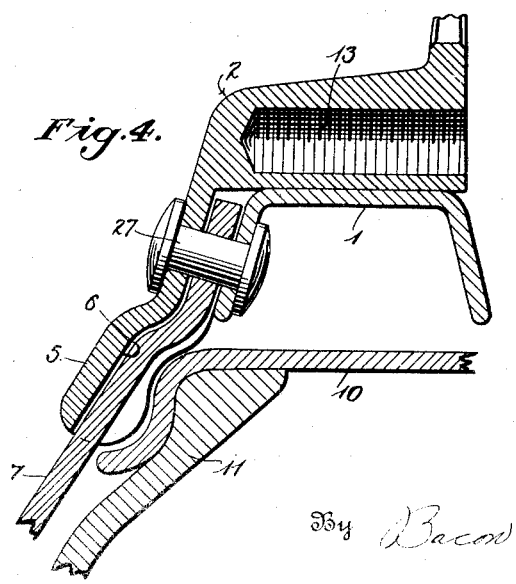
Figure 4 is a view of the modified form of the invention where the locking assembly is built with the carrier.

In the modified form of the invention shown in Figure 4, the locking mechanism is shown as having a part thereof built permanently to the tire carrier. In this construction the rim clamp 2 is riveted by a rivet 27 to the rim carrier. The locking strap 7 is retained in position by this rivet. Otherwise the structure is the same as set forth in Figures 1, 2 and 3 of the drawings. It will furthermore be understood that in using this device a chain, cable or any other flexible member may be employed in lieu of the strap 7 for encircling the tire and the spare rim.

Assume that it is desired to remove a tire from the spare rim. A key is inserted in the key slot of the cap 24, and this key actuated to retract the bolts 25. This permits the removal of the cap from the opening 23 in the front wall of the housing. An instrument is then inserted through this opening and the head 15 of the bolt 14 engaged. This is rotated to remove the bolt from the opening 13 in the rim clamp. The entire clamp lock housing 12 is then separated from the rim clamp 2. The free end of the strap 7 is likewise disconnected from the bolt and as the sections of this strap are hinged together as designated by the character A, the free end falls down so that the tire 11 and its rim 10 can be lifted from the carrier. To lock a spare tire and its rim on the carrier, this operation is just reversed. That is to say, the tire and its rim are placed on the carrier and the clamp lock housing moved to the position shown in Figure 1. At this time the free end of the strap 7 is disposed within the cavity in this housing. When the opening in this strap is properly aligned, then the bolt 14 is inserted through the opening and the opening 17 of the rear wall of the housing after which the bolt is tightened. When the bolt is properly tightened, then the cap 24 is locked in position.

In the modified form of the invention, as shown in Figs. 5 and 6, the rim clamp 2' carries the locking strap which flares to provide the extension 31 which acts as a housing for the lock clamp housing receiving the locking assembly 24. In this construction the rim clamp portion 2' is provided with a transverse bar 28 having the threaded bore 29 therein receiving the threaded locking bolt 14' by means of which the strap 7 is retained around the tire. Unauthorized access to this bolt is prevented by the locking assembly 24. The member 12' is preferably riveted to the strap 7 by the rivets 32.

Having thus described the invention, what we claim is:

1. The combination with a tire carrier, of a spare tire and rim thereon, of mechanism for securing the spare tire and rim to the carrier comprising a rim clamp attached to said carrier, a tire encircling member secured to said clamp, a clamp housing, means for detachably securing said housing and the free end of the tire encircling member to said rim clamp, said means including a manually operable element, and key actuated means for preventing unauthorized access to said element.

2. The combination with a tire carrier, of a rim clamp secured thereto having a tire rim engaging portion at one end thereof, said rim clamp being provided with a lateral bore, a removable clamp housing adapted to be attached to said rim clamp, said housing having front and rear walls with a cavity therebetween, means passing through the rear wall and engaging said rim clamp for uniting said clamp housing to the rim clamp, said housing having an opening in the front wall thereof, and a lock controlled closure in said opening.

3. The combination with a tire carrier, of a rim clamp secured thereto having a tire rim engaging portion at one end thereof, said rim clamp being provided with a lateral bore, a removable clamp housing adapted to be attached to said rim clamp, said housing having front and rear walls with a cavity therebetween, means passing through the rear wall and engaging said rim clamp for uniting said clamp housing to the rim clamp, said housing being provided with an opening in the front wall thereof, and a lock controlled closure in said opening, a tire encircling element permanently connected with said rim clamp, said housing being provided with an opening leading to the cavity therein through which said element passes, and means in said element for permitting the same to be secured to the clamp housing.

4. The combination with a tire carrier, of a rim clamp secured thereto and having a spare rim engaging flange thereon, a flange projecting from said carrier at one side thereof to form a pocket, a removable clamp housing cooperating with said rim clamp, said housing having front and rear walls with a cavity therebetween, means entering said cavity and cooperating with the rear wall of said housing and with said rim clamp for securing said housing to the rim clamp, said rim clamp having an opening for permitting access to be had to said securing means, and a lock controlled closure for said opening.

5. The combination with a tire carrier, of a rim clamp secured thereto at one side of the carrier, a spare tire encircling element attached to said carrier, a removable clamp housing disposed adjacent the opposite side of said tire carrier, front and rear walls of said housing providing a cavity therebetween, said housing being provided with an opening leading to said cavity through which the free end of said tire encircling element passes, detachable means for securing said rim clamp with the clamp housing and said free end of the tire encircling element, said clamp lock housing having an instrument receiving opening in one of the walls thereof, and a key actuated closure for controlling said opening.

6. A locking device of the character described, providing a rim clamp adapted to be secured to a tire carrier, means on said clamp for engaging a rim, a removable clamp housing adapted to be secured to said rim clamp at one side thereof, separated front and rear walls forming in said clamp housing a cavity, means for uniting the clamp housing to the rim clamp having a part theerof located in said cavity, one of said walls having an opening leading to the cavity, and a lock controlled closure for said opening.

7. A rim clamp housing for securing a spare rim and tire to a tire carrier having separated front and rear walls providing therebetween a cavity, said housing being formed with an opening in its lower portion leading to said cavity, means formed in the rear wall of the housing for the passage of a securing element, the opposite wall of said housing being provided with an opening, and a lock controlled closure for said opening.

In testimony whereof we affix our signatures.

HARRY A. WEAVER.
F. ARTHUR SMITH.